United States Patent [19]

Okumura et al.

[11] Patent Number: 5,236,562
[45] Date of Patent: Aug. 17, 1993

[54] METHOD FOR DISCHARGING HYDROGEN FROM A VACUUM VESSEL USING A ROUGHING VACUUM PUMP AND A TURBO-MOLECULAR PUMP

[75] Inventors: Katsuya Okumura, Kanagawa; Haruo Okano; Manabu Tsujimura, both of Tokyo; Akio Shibata, Kanagawa, all of Japan

[73] Assignees: Ebara Corporation, Tokyo; Kabushiki Kaisha Toshiba, Kanagawa, both of Japan

[21] Appl. No.: 672,237

[22] Filed: Mar. 20, 1991

[30] Foreign Application Priority Data

Mar. 20, 1990 [JP] Japan ............... 2-68459

[51] Int. Cl.$^5$ .......................... C25B 1/02
[52] U.S. Cl. ............... 204/155; 204/157.41; 204/157.43; 204/157.44; 204/164; 417/49; 417/423.4
[58] Field of Search ............ 62/55.5; 415/90; 417/53, 423.4, 49, 157.43, 157.44; 204/157.48, 157.3, 157.41, 157.15, 155, 164

[56] References Cited

U.S. PATENT DOCUMENTS

| | | | |
|---|---|---|---|
| 3,488,978 | 1/1970 | Porta et al. | 62/55.5 |
| 3,536,418 | 10/1970 | Breaux | 417/49 |
| 3,772,172 | 11/1973 | Zhagatspanian | 204/157.1 |
| 4,460,317 | 7/1984 | Kern et al. | 417/49 |
| 4,559,787 | 12/1985 | Batzer et al. | 62/55.5 |
| 4,723,363 | 2/1988 | Seelbach | 34/9 |
| 4,820,226 | 4/1989 | Hsu | 417/49 |
| 4,886,048 | 12/1989 | Labaton et al. | 165/104.27 |
| 4,892,142 | 1/1990 | Labaton | 165/134.1 |

FOREIGN PATENT DOCUMENTS 2560067 2/1984 France .

OTHER PUBLICATIONS

Patent Abstract of Japan, vol. 9, No. 164 (M-395) [1887], Jul. 10, 1985 p. 3M 395; and JP-A-60 36 791 (Kogyo Gijutsuin) Feb. 2, 1985.

Primary Examiner—Peter Chin
Assistant Examiner—Dean Tan Nguyen
Attorney, Agent, or Firm—Armstrong, Westerman, Hattori, McLeland & Naughton

[57] ABSTRACT

A method and apparatus for discharging hydrogen from a vacuum vessel using a roughing vacuum pump and a turbo-molecular pump. During discharge of hydrogen from the vacuum vessel, a material which has excellent reactivity with hydrogen, such as a material which has been excited or ionized by microwave or laser radiation, is introduced into the exhaust system. The material reacts with hydrogen to convert hydrogen into another substance of large molecular weight, whereby the evacuating performance of the vacuum exhaust system is improved with respect to discharging of hydrogen.

9 Claims, 1 Drawing Sheet

METHOD FOR DISCHARGING HYDROGEN FROM A VACUUM VESSEL USING A ROUGHING VACUUM PUMP AND A TURBO-MOLECULAR PUMP

BACKGROUND OF THE INVENTION

1. Field of the Invention

The present invention relates generally to evacuation of a vacuum vessel and, more particularly, to a method and apparatus for evacuation for efficiently discharging hydrogen from a vacuum vessel.

2. Description of the Prior Art

To evacuate a vacuum vessel to the extent of producing a high or ultra-high vacuum, a turbo-molecular pump has been conventionally used. Such type of pumps, however, have a drawback in that they cannot sufficiently discharge light weight gases such as hydrogen from a vacuum vessel since their ability to evacuate light weight gases having a relatively low molecular weight, such as hydrogen is insufficient.

SUMMARY OF THE INVENTION

An object of the present invention is therefore to obviate the above-mentioned drawback by providing a method and apparatus for discharging hydrogen from a vacuum exhaust system to evacuate the interior of a vacuum vessel to produce a high level of vacuum.

Another object of the invention is to provide a method and apparatus which are capable of easily discharging hydrogen under high vacuum range as well as low vacuum range with a simple arrangement while fulfilling the above object.

A further object of the invention is to provide a method and apparatus which are applicable to a conventional vacuum exhaust system including a single or plurality of turbo-molecular pumps while fulfilling the above objects.

To achieve the above-mentioned object, according to one aspect of the present invention, a method of the present invention comprises a step of discharging hydrogen from a vacuum vessel by means of a roughing vacuum pump and a turbo-molecular pump and is characterized by the inclusion of a step of introducing, while discharging hydrogen from the vacuum vessel, a material which has excellent reactivity with hydrogen into the exhaust system. Also, an apparatus of the present invention comprises a roughing vacuum pump and a turbo-molecular pump for evacuating a vacuum vessel, the apparatus being characterized in that in an exhaust system between the vacuum vessel and the roughing vacuum pump an inlet is provided for the introduction of a material which has excellent reactivity with hydrogen.

According to another aspect of the present invention, a method of the present invention comprises a step of discharging hydrogen from a vacuum vessel by means of a roughing pump and a turbo-molecular pump and is characterized by the inclusion of the steps of introducing, during discharge of hydrogen from the vacuum vessel, a material which has excellent reactivity with hydrogen into the exhaust system, while exciting or ionizing such a material to promote reaction with hydrogen. Likewise, an evacuating apparatus according to another aspect of the invention comprises a roughing vacuum pump and a turbo-molecular pump for evacuating a vacuum vessel, and is characterized in that in an exhaust system between the vacuum vessel and the roughing vacuum pump an inlet for the introduction of the material which has excellent reactivity with hydrogen is provided together with means for exciting or ionizing such a material.

The means for exciting or ionizing the material of excellent reactivity may comprise at least one of: application of microwaves; application of heat energy; irradiation with ultraviolet or laser radiation; irradiation with a beam of electrons or charged particles; irradiation with an ionizing wave or atomic beam; application of magnetic or electrical field; generation of a plasma; loading of a source of heat rays or heater; imparting an elastic wave; and charging a reaction-promoting material such as a catalyst.

The material, which has excellent reactivity with hydrogen may be any material which displays such properties. Such a material, however, should preferably be a gas or a material which can be readily gasified, such as halogens, ozone, etc., since a material is introduced into the exhaust system as a gas.

If the material used is a liquid or solid, a gasifying chamber, in which such material is gasified by some means such as pressure reduction or temperature increase, is provided before an inlet point for the material into the vacuum exhaust system.

To introduce into the vacuum exhaust system the gasified material for reaction with hydrogen, an inlet may be provided at one or more places on the suction port-side, interior, or exhaust-port-side of the turbo-molecular pump. A single, or a plurality of turbo-molecular pumps may be used. In the latter case, a reaction chamber for exciting or ionizing the material therein may be arranged between the turbo-molecular pumps, and the inlet for the introduction of the material may be provided at one or several points in the turbo-molecular pumps including the reaction chamber.

As stated above, in the present invention, means for exciting or ionizing the material, which has excellent reactivity with hydrogen, should preferably be provided before the introduction into the vacuum exhaust system or the introduced gas should preferably be excited or ionized in a reaction chamber which is provided between the turbo-molecular pumps so that the introduced gas can rapidly react with hydrogen.

In accordance with the method and apparatus of the present invention, a material which has excellent reactivity with hydrogen is introduced into the path of the vacuum exhaust system where it reacts with hydrogen to convert hydrogen into another substance of larger molecular weight, whereby the evacuating performance of the vacuum exhaust system is improved with respect to the function of discharging hydrogen.

For example, halogen gases, such as chlorine or fluorine, have excellent reactivity with hydrogen. Chlorine and hydrogen, when reacted with each other, will form hydrogen chloride HCl whose molecular weight (36.5) is about 18 times as large as hydrogen $H_2$ (2). In this case, since the compression ratio of the turbo-molecular pump has a value for hydrogen chloride which is about $10^9$ times (calculated value) as large as the value for hydrogen, the hydrogen-discharging function is improved.

The above and other objects, features and advantages of the present invention will become more apparent from the following description when taken in conjunction with the accompanying drawings in which preferred embodiments of the present invention are shown by way of illustrative examples.

DETAILED DESCRIPTION OF THE PREFERRED EMBODIMENTS

Embodiment 1

Figure 1:
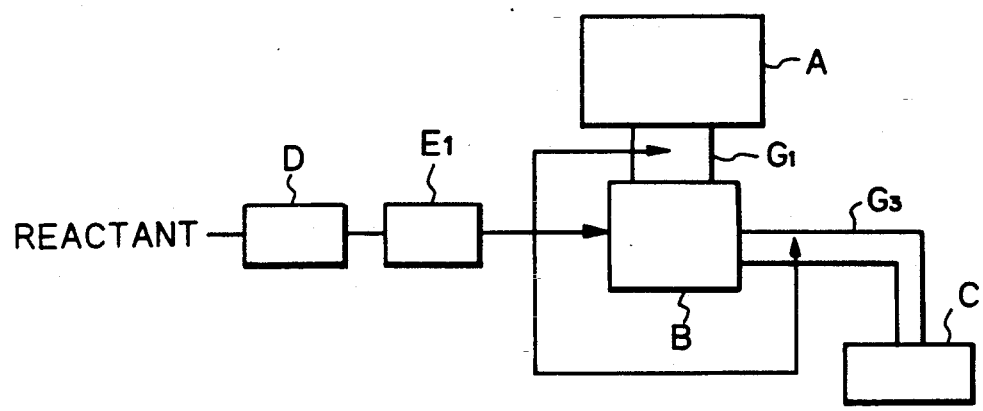
FIGS. 1 and 2 are diagrams conceptionally showing preferred embodiments of the evacuating apparatus according to the present invention.

FIG. 1 is a diagram conceptionally showing an embodiment of the evacuating apparatus according to the present invention. In FIG. 1, a vacuum vessel A is initially evacuated by a roughing vacuum pump C and then it is further evacuated by a turbo-molecular pump B to high vacuum. In accordance with the present invention, a reactant which has excellent reactivity with hydrogen is introduced into the evacuating apparatus during evacuating operation. If the reactant is not a gas, then it is initially gasified in a gasifying chamber D, excited in an exciting section $E_1$, and is then introduced into the turbo-molecular pump B, and the suction and exhaust ports, $G_1$ and $G_3$, respectively, of the turbo-molecular pump.

A description is given with respect to an example case where chlorine is used as the reactant. If the exciting chamber $E_1$ is arranged outside the vacuum exhaust system, then chlorine gas is initially introduced into the exciting chamber $E_1$. In this case, the gasifying chamber D is unnecessary since chlorine is in gaseous form at ordinary temperatures and at ordinary pressures. In this case, the following reaction:

$$Cl_2 \rightarrow 2Cl \quad (1)$$

is caused by introducing a microwave into the exciting chamber $E_1$ to form a plasma state while maintaining the pressure in the exciting chamber $E_1$ at about 1 Torr, whereby chlorine radicals are generated. Such chlorine radicals are introduced into the vacuum exhaust system through the inlets for material and, within the vacuum exhaust system, the following reaction will occur:

$$H_2 + 2Cl \rightarrow 2HCl \quad (2)$$

Embodiment 2

Figure 2:
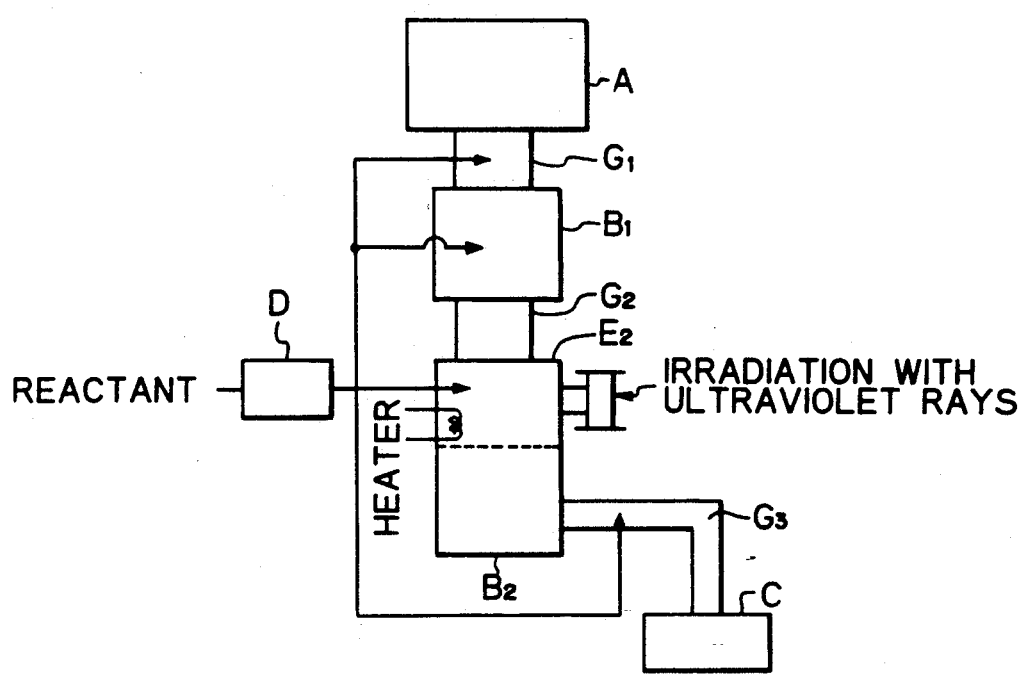

FIG. 2 is a diagram conceptionally showing another embodiment of the evacuating apparatus according to the present invention. In FIG. 2, two turbo-molecular pumps $B_1$ and $B_2$ are arranged in series, between which a reaction chamber $E_2$ is provided. A reactant is excited in this reaction chamber. In this reaction chamber $E_2$, irradiation is effected with ultraviolet rays through a light-transmitting window of quartz, for example.

In this apparatus, the reactant is initially gasified in the gasifying chamber D and is then introduced into the suction port $G_1$ and the interior of the turbo-molecular pump $B_1$, the reaction chamber $E_2$ and the exhaust port $G_3$ of the turbo-molecular pump $B_2$, where it reacts with hydrogen.

In this case, if chlorine is introduced as the reactant and irradiation is effected with ultraviolet radiation in the reaction chamber $E_2$ through a light-transmitting window, the following reaction will occur:

$$h\nu + Cl_2 \rightarrow 2Cl \quad (3)$$

whereby chlorine radicals are generated. Subsequently, the reaction of formula (2) occurs within the vacuum exhaust system and generates hydrogen chloride.

Hydrogen chloride thus formed can be promptly discharged by the turbo-molecular pumps since it has a high molecular weight, i.e. 36.5, as described previously.

Thus, with the use of the method and apparatus according to the present invention, it is possible to easily discharge hydrogen under high vacuum, which has been very difficult to perform with conventional turbo-molecular pumps. For example, it allows the pressure to promptly reach a range of values not higher than $10^{-10}$ Torr (ultra high vacuum). It also makes it possible to discharge, even under a low vacuum range, a substantial amount of hydrogen which could not be discharged by ordinary turbo-molecular pumps so far.

What is claimed is:

1. A method for discharging hydrogen from a vacuum vessel comprising evacuating the vacuum vessel with a roughing vacuum pump and a vacuum exhaust system including a turbo-molecular pump and further comprising introducing into the vacuum exhaust system, during discharge of hydrogen from the vacuum vessel, a material which has excellent reactivity with hydrogen, and initiating the reaction between said material with hydrogen to convert the hydrogen into another substance of larger molecular weight whereby the evacuating performance of the vacuum exhaust system is improved.

2. A method for discharging hydrogen from a vacuum vessel comprising evacuating the vacuum vessel with a roughing vacuum pump and a vacuum exhaust system including a turbo-molecular pump and further comprising introducing into the vacuum exhaust system, during discharge of hydrogen from the vacuum vessel, a material which has excellent reactivity with hydrogen, and ionizing or exciting said material with hydrogen to convert the hydrogen into another substance of larger molecular weight whereby the evacuating performance of the vacuum exhaust system is improved.

3. The method for discharging hydrogen from a vacuum vessel as claimed in claim 2, wherein said exciting or ionizing of the material of excellent reactivity is effected by means of at least one of: application of microwave; application of heat energy; irradiation with ultraviolet or laser radiation; irradiation with a beam of electrons or charged particles; irradiation with an ionizing wave or atomic beam; application of a magnetic or electrical field; generation of a plasma; loading of a source of heat rays or heater; imparting an elastic wave; and charging a reaction-promoting material.

4. The method for discharging hydrogen from a vacuum vessel as claimed in any one of claims 1 to 3, wherein said material is a gas or a material which can be readily gasified.

5. The method for discharging hydrogen from a vacuum vessel as claimed in claim 2 or 3, wherein said exciting or ionizing of said material is effected before introduction of said material into said exhaust system.

6. The method for discharging hydrogen from a vacuum vessel as claimed in claim 2 or 3, wherein said exciting or ionizing of said material is effected in a reaction chamber provided in said exhaust system.

7. The method for discharging hydrogen from a vacuum vessel as claimed in claim 4, wherein said gas is chlorine or fluorine.

8. The method for discharging hydrogen from a vacuum vessel as claimed in claim 4, wherein the material which can be readily gasified is one of halogens and ozone.

9. The method for discharging hydrogen from a vacuum vessel as claimed in claim 3, wherein the reaction promoting material is a catalyst.

* * * * *